United States Patent Office 3,139,446
Patented June 30, 1964

3,139,446
5α,10β-DIHALO ESTRANES AND PROCESS
THEREFOR
Albert Bowers, Mexico City, Mexico, assignor, by mesne
assignments, to Syntex Corporation, a corporation of
Panama
No Drawing. Filed May 2, 1961, Ser. No. 107,050
17 Claims. (Cl. 260—397.4)

The present invention relates to novel cyclopentanophenanthrene compounds and to a process for the production thereof.

More particularly the present invention relates to 5,10-dihaloestrane derivatives.

The novel compounds of the present invention are represented by the following formulas:

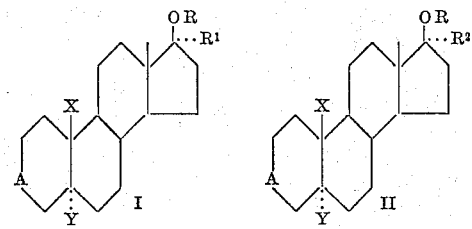

In the above formulae, A represents the carbonyl radical

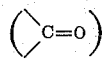

the β-hydroxymethylene group

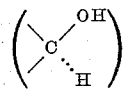

or the β-hydrocarbon carboxylic acyloxymethylene group

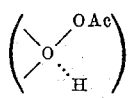

X represents bromine, chlorine or iodine; Y represents chlorine, bromine or fluorine; R represents hydrogen or a hydrocarbon carboxylic acyl group of less than 12 carbon atoms; $R^1$ represents hydrogen or an alkyl group containing up to 8 carbon atoms such as methyl, ethyl, propyl, n-butyl and the like. When $R^1$ represents hydrogen, R represents solely a hydrocarbon carboxylic acyl group. $R^2$ represents an alkenyl or alkynyl group containing up to 12 carbon atoms such as ethenyl, propen(1)yl, buten(3)-yl, ethynyl, propyn(1)yl, propen(2)yl, butyn(2)yl and the like.

The acyl groups are derived from hydrocarbon carboxylic acids of less than twelve carbon atoms, saturated or unsaturated, of straight, branched, cyclic or cyclic-aliphatic chain, aromatic and may be substituted by functional groups such as hydroxy, alkoxy containing up to 5 carbon atoms, acyloxy containing up to 8 carbon atoms, amino, nitro or halogen. Typical ester groups are the acetate, propionate, butyrate, benzoate, cyclopentylpropionate, aminoacetate, β-chloropropionate, hemisuccinate, enanthate, caproate, trimethylacetate, methoxyacetate, phenoxyacetate, and phenylpropionate.

The compounds represented by the above Formula I are therapeutic agents usable in known manner both orally and by injection, for agents having androgenic and anabolic activities with a favorable anabolic-androgenic ratio. These compounds also have anti-gonadotropic and anti-estrogenic activities, inhibit the secretion of the pituitary gland and lower the blood cholesterol level.

The compounds represented by the above Formula II the therapeutic agents having oral progestational activity and inhibit ovulation. These are also usable in conventional oral manner or by the way of injection. These compounds also have anti-estrogenic, anti-androgenic and anti-gonadotropic activity, inhibit the secretion of the pituitary gland and lower the blood cholesterol level.

The novel compounds of the present invention may be prepared by a process illustrated by the following equation:

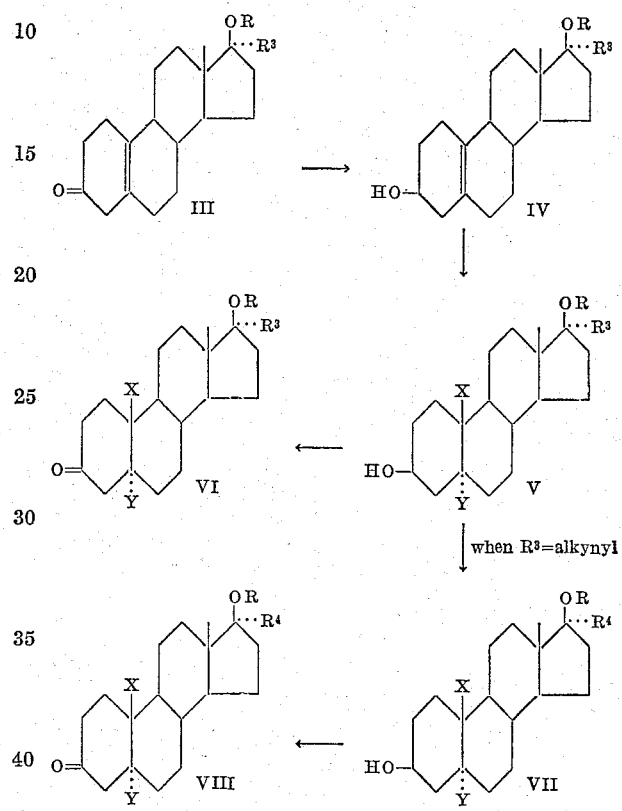

In the above formulae, X, Y and R have the same meaning as previously set forth, $R^3$ represents hydrogen or an alkyl or alkynyl group containing up to 12 carbon atoms and $R^4$ represents an alkenyl group containing up to 12 carbon atoms.

In practicing the process outlined above, the starting compound, 17β - acetoxy - $\Delta^{5(10)}$ - estren - 3 - one (III) [Djerassi et al., J. Am. Chem. Soc. 78, 6362 (1956)] is reduced with a metal hydride preferably sodium borohydride in a suitable solvent such as methanol giving 17β-acetoxy-$\Delta^{5(10)}$-estren-3β-ol (IV).

Treatment of this compound with a halogenating agent in a suitable solvent such as bromine in carbon tetrachloride yields 5α,10β - dibromo - 17β - acetoxy - estran-3β-ol ($V:X=Y=$bromine).

The halogenating agent may also be a halogen halide as for example bromine fluoride in which case the agent is generated in situ from an N-halo-amide in this case N-bromoacetamide and the corresponding hydrogen halide, in this case hydrogen fluoride, and the reaction is conducted at very low temperature as for example —80° C., thus affording: 5α - fluoro - 10β - bromo - 17β - acetoxy-estran-3β-ol ($V:X=$bromine; $Y=$fluorine). When this sequence of reactions is applied to a 17α-alkynyl-estrane derivative such as 17α-ethynyl-$\Delta^{5(10)}$ - estren - 17β - ol-3-one (F. B. Colton, U.S. Patent 2,725,389) utilising as the halogenating agent for example bromine in carbon tetrachloride, there is obtained 5α,10β - dibromo - 17α-ethynyl-estrane - 3β,17β - diol which upon hydrogenation in the presence of a suitable catalyst such as palladium on calcium carbonate affords the corresponding 17α-alkenyl derivative which in this case is 5α,10β-dibromo-17α-ethenyl-estrane-3β,17β-diol (VII).

Upon oxidation of the above-mentioned 3β-alcohols such as 5α,10β-dibromo-17β-acetoxy-estran-3β-ol or 5α,10β-dibromo-17α-ethenyl-estrane-3β,17β-diol with, for example, 8 N chromic acid, there are obtained the corresponding 3-ketone derivatives, in this case 5α,10β-dibromo-17β-acetoxy-estran-3-one (VI) or 5α,10β-dibromo-17α-ethenyl-estran-17β-ol-3-one (VIII).

Upon acylation of a 17β-alcohol derivative selected from the above obtained compounds such as 5α,10β-dibromo-17α-ethynyl-estrane-3β,17β-diol in the presence of p-toluenesulfonic acid with an acylating agent as for example acetic anhydride, there is obtained the corresponding diester, in this case the 3β,17β-diacetate of 5α,10β-dibromo-17α-ethynyl-estrane-3β,17β-diol. A 3-ketone such as 5α,10β-dibromo-17α-ethenyl-estran-17β-ol-3-one affords the corresponding 17β-monoester, in this case the 17β-acetate of 5α,10β-dibromo-17α-ethenyl-estran-17β-ol-3-one.

Acylation of a 3β,17β-diol derivative as for example 5α,10β-dibromo-17α-methyl-estrane-3β,17β-diol in the absence of p-toluenesulfonic acid affords the corresponding 3β-monoester, in this case the 3β-acetate of 5α,10β-dibromo-17α-methyl-estran-3β,17β-diol.

The following specific examples serve to illustrate but are not intended to limit the present invention:

Example I 1 g. of 17β-acetoxy-Δ$^{5(10)}$estren-3-one [Djerassi et al., J. Am. Chem. Soc. 78, 6362 (1956)] was suspended in 120 cc. of methanol and treated at 0° C. with a solution of 350 mg. of sodium borohydride in 1 cc. of water. The mixture was kept overnight at room temperature. The excess reagent was decomposed by addition of acetic acid and the resulting solution was concentrated under vacuum to a small volume. Water was added and the product extracted with ethyl acetate. The extract was washed with water, dried over anhydrous sodium sulfate and evaporated to dryness. The solid residue was recrystallized from acetone-methylene chloride, thus furnishing 17β-acetoxy-Δ$^{5(10)}$-estren-3β-ol.

To a solution of 0.75 g. of the foregoing steroid in 40 cc. of carbon tetrachloride there was added dropwise a solution of bromine in the same solvent containing 1.1 molar equivalents of bromine. The operation was conducted under constant stirring and at room temperature. The resulting mixture was kept at the same temperature for thirty minutes, then poured into a 5% sodium bicarbonate aqueous solution and more carbon tetrachloride was added for the extraction of the product. The extract was subsequently washed with water, dried over anhydrous sodium sulfate and evaporated to dryness. Crystallization from acetone-hexane yielded 5α,10β-dibromo-17β-acetoxy-estran-3β-ol.

Example II

Using exactly the same conditions described in Example I except that the bromine solution was substituted by a chlorine solution there was obtained 5α,10β-dichloro-17β-acetoxy-estran-3β-ol.

Example III 750 mg. of 17β-acetoxy-Δ$^{5(10)}$-estren-3β-ol obtained according to Example I was suspended together with 1.1 molar equivalents of N-bromoacetamide in 35 cc. of anhydrous methylene chloride and added over 3 minutes with stirring to a mixture of 75 mol equivalents of anhydrous hydrogen fluoride and 18 g. of anhydrous tetrahydrofuran in a polyethylene bottle at −80° C. After one hour at this temperature, it was kept for another hour at 0° C. and then added cautiously to an excess of an ice-cold solution of sodium carbonate. Extraction with methylene chloride and crystallization from acetone-hexane furnished 5α - fluoro - 10β - bromo-17β-acetoxy-estran-3β-ol.

Example IV

Following exactly the same procedure described in Example III except that the hydrogen fluoride was substituted by hydrogen chloride, there was obtained 5α-chloro-10β-bromo-17β-acetoxy-estran-3β-ol.

Example V

A suspension of 1 g. of 17β-acetoxy-Δ$^{5(10)}$-estren-3β-ol (obtained according to Example I) and 1.1 molar equivalents of N-iodo succinimide in 20 cc. of methylene chloride was added with stirring over 5 minutes to a mixture of 75 mol. equivalents of anhydrous hydrogen fluoride and 18 g. of anhydrous tetrahydrofuran at −80° C. The operation was conducted in a polyethylene bottle. After 2 hours at −80° C. and 12 hours at 0° C. the mixture was added cautiously to an excess of sodium bicarbonate in ice-water. The product was extracted in the methylene chloride and the extract washed successively with water, sodium thiosulfate solution and water, dried over sodium sulfate and evaporated to dryness. Crystallization from acetone-hexane afforded 5α-fluoro-10β-iodo-17β-acetoxy-estran-3β-ol.

Example VI 1 g. of 17β-acetoxy-Δ$^{5(10)}$-estren-3β-ol (obtained according to Example I) was treated following exactly the same procedure described in Example V except that the hydrogen fluoride was substituted by hydrogen chloride and furnished 5α-chloro-10β-iodo-17β-acetoxy-estran-3β-ol.

Example VII 1 g. of 17α-methyl-Δ$^{5(10)}$-estren-17β-ol-3-one (F. B. Colton, U.S. Patent 2,905,676) was reduced exactly in the same way as described in Example I thus furnishing 17α-methyl-Δ$^{5(10)}$-estrene-3β,17β-diol.

A solution of 0.75 g. of the foregoing steroid was brominated following the procedure described in Example I furnishing 5α,10β-dibromo-17α-methyl-estran-3β,17β-diol.

Example VIII 1 g. of 17α-methyl-Δ$^{5(10)}$-estrene-3β,17β-diol (obtained according to Example VII) was chlorinated such as described in Example II yielding 5α,10β-dichloro-17α-methyl-estrane-3β,17β-diol.

Example IX

Following the procedure described in Example III, the reaction of 17α-methyl-Δ$^{5(10)}$-estrene-3β,17β-diol with the bromine fluoride (formed in situ from the N-bromoacetamide and hydrogen fluoride) furnished 5α-fluoro-10β-bromo-17α-methyl-estrane-3β,17β-diol.

Example X

Upon treatment of 17α-methyl-Δ$^{5(10)}$-estrene-3β,17β-diol in the same way as described in Example IV, there was obtained 5α-chloro-10β-bromo-17α-methyl-estrane-3β,17β-diol.

Example XI 1 g. of 17α-methyl-Δ$^{5(10)}$-estrene-3β,17β-diol was treated following exactly the procedure described in Example V thus furnishing 5α-fluoro-10β-iodo-17α-methyl-estrane-3β,17β-diol.

Example XII 1 g. of 17α-methyl-Δ$^{5(10)}$-estrene-3β,17β-diol was treated in accordance with the method described in Example VI, giving 5α-chloro-10β-iodo-17α-methyl-estrane-3β,17β-diol.

Example XIII 1 g. of 17α-ethyl-Δ$^{5(10)}$-estren-17β-ol-3-one (F. B. Colton, U.S. Patent 2,905,676), was reduced with sodium borohydride, following exactly the procedure described in Example I, giving 17α-ethyl-Δ$^{5(10)}$-estrene-3β,17β-diol. This steroid was brominated such as described in the same example, thus affording 5α,10β-dibromo-17α-ethyl-estran-3β,17β-diol.

Example XIV 1 g. of 17α-ethyl-Δ$^{5(10)}$-estrene-3β,17β-diol obtained according to Example XIII was chlorinated following the technique disclosed in Example II yielding 5α,10β-dichloro-17α-ethyl-estrane-13β,17β-diol.

Example XV

Following the procedure described in Example III, the reaction of 17α-ethyl-Δ$^{5(10)}$-estrene-3β,17β-diol with N-bromoacetamide and hydrogen fluoride, furnished 5α-fluoro-10β-bromo-17α-ethyl-estran-3β,17β-diol.

Example XVI

Treating 1 g. of 17α-ethyl-Δ$^{5(10)}$-estrene-3β,17β-diol such as described in Example IV, there was obtained 5α-chloro-10β-bromo-17α-ethyl-estrane-3β,17β-diol.

Example XVII 0.750 mg. of 17α-ethyl-Δ$^{5(10)}$-estrene-3β,17β-diol were treated following the technique described in Example V giving 5α-fluoro-10β-iodo-17α-ethyl-estrane-3β,17β-diol.

Example XVIII 1 g. of 17α-ethyl-Δ$^{5(10)}$-estrene-3β,17β-diol was treated in accordance with the method described in Example VI, giving 5α-chloro-10β-iodo-17α-ethyl-estrane-17β,3β-diol.

Example XIX 1 g. of 17α-ethynyl-Δ$^{5(10)}$-estren-17β-ol-3-one (F. B. Colton, U.S. Patent 2,725,389) was reduced with sodium borohydride such as described in Example I furnishing 17α-ethynyl-Δ$^{5(10)}$-estrene-3β,17β-diol.

This steroid was brominated in exactly the same conditions as described in Example I thus affording 5α,10β-dibromo-17α-ethynyl-estrane-3β,17β-diol.

Example XX 1 g. of 17α-ethynyl-Δ$^{5(10)}$-estrene-3β,17β-diol was chlorinated following the technique described in Example II yielding 5α,10β-dichloro-17α-ethynyl-estrane-3β,17β-diol.

Example XXI 1 g. of 17α-ethynyl-Δ$^{5(10)}$-estrene-3β,17β-diol was treated in the same way as described in Example III giving 5α-fluoro-10β-bromo-17α-ethynyl-estrane-3β,17β-diol.

Example XXII

Upon treatment of 17α-ethynyl-Δ$^{5(10)}$-estrene-3β,17β-diol following the technique described in Example IV, there was obtained 5α-chloro-10β-bromo-17α-ethynyl-estrane-3β,17β-diol.

Example XXIII

Treating 1 g. of 17α-ethynyl-Δ$^{5(10)}$-estrene-3β,17β-diol such as described in Example V, there was obtained 5α-fluoro-10β-iodo-17α-ethynyl-estrane-3β,17β-diol.

Example XXIV 1 g. of 17α-ethynyl-Δ$^{5(10)}$-estrene-3β,17β-diol was treated in accordance with Example VI, thus yielding 5α-chloro-10β-iodo-17α-ethynyl-estrane-3β,17β-diol.

Example XXV 1 g. of 5α,10β-dibromo-17α-ethynyl-3β,17β-diol (obtained in accordance with Example XIX) dissolved in 50 cc. of pyridine and in the presence of 800 mg. of prehydrogenated 2% palladium on calcium carbonate catalyst was stirred under hydrogen at room temperature and atmospheric pressure. When 1 mol equivalent of hydrogen was absorbed, the reaction was stopped, the catalyst filtered, washed with ethyl acetate, and the combined solutions evaporated to dryness under vacuum. The crude product was recrystallized from acetone yielding 5α,10β-dibromo-17α-ethenyl-estrane-3β,17β-diol.

Treating exactly in the same way the starting materials mentioned below, there were obtained the corresponding products indicated:

| Starting material | Product |
| --- | --- |
| 5α, 10β-dichloro-17α-ethynyl-estrane-3β, 17β-diol (Example XX). | 5α, 10β-dichloro-17α-ethenyl-estrane-3β, 17β-diol. |
| 5α-fluoro-10β-bromo-17α-ethynyl-estrane-3β, 17β-diol (Example XXI). | 5α-fluoro-10β-bromo-17α-ethenyl-estrane-3β, 17β-diol. |
| 5α-chloro-10β-bromo-17α-ethynyl-estrane-3β, 17β-diol (Example XXII). | 5α-chloro-10β-bromo-17α-ethenyl-estrane-3β, 17β-diol. |
| 5α-fluoro-10β-iodo-17α-ethynyl-estrane-3β, 17β-diol (Example XXIII). | 5α-fluoro-10β-iodo-17α-ethenyl-estrane-3β, 17β-diol. |
| 5α-chloro-10β-iodo-17α-ethynyl-estrane-3β, 17β-diol (Example XXIV). | 5α-chloro-10β-iodo-17α-ethenyl-estrane-3β, 17β-diol. |

Example XXVI

An excess of 8 N chromic acid was added to a solution of 0.5 g. of 5α,10β-dibromo-17β-acetoxy-estran-3β-ol in 15 cc. of acetone at 0° C. After 2 minutes, ice-water was added and the product extracted with methylene chloride. The extract was washed successively with 5% aqueous sodium bicarbonate solution to neutral, then it was dried over anhydrous sodium sulfate and evaporated to dryness under vacuum. The solid residue was recrystallized from acetone-hexane affording 5α,10β-dibromo-17β-acetoxy-estran-3-one.

In accordance with the method described were treated the starting materials listed below, thus furnishing the corresponding products indicated:

| Starting material | Product |
| --- | --- |
| 5α, 10β-dichloro-17β-acetoxy-estran-3-ol. | 5α, 10β-dichloro-17β-acetoxy-estran-3-one. |
| 5α-fluoro-10β-bromo-17β-acetoxy-estran-3β-ol. | 5α-fluoro-10β-bromo-17β-acetoxy-estran-3-one. |
| 5α-chloro-10β-bromo-17β-acetoxy-estran-3β-ol. | 5α-chloro-10β-bromo-17β-acetoxy-estran-3-one. |
| 5α-fluoro-10β-iodo-17β-acetoxy-estran-3β-ol. | 5α-fluoro-10β-iodo-17β-acetoxy-estran-3-one. |
| 5α-chloro-10β-iodo-17β-acetoxy-estran-3β-ol. | 5α-chloro-10β-iodo-17β-acetoxy-estran-3-one. |
| 5α, 10β-dibromo-17α-methyl-estrane-3β, 17β-diol. | 5α, 10β-dibromo-17α-methyl-estran-17β-ol-3-one. |
| 5α, 10β-dichloro-17α-methyl-estrane-3β, 17β-diol. | 5α, 10β-dichloro-17α-methyl-estran-17β-ol-3-one. |
| 5α-fluoro-10β-bromo-17α-methyl-estrane-3β, 17β-diol. | 5α-fluoro-10β-bromo-17α-methyl-estran-17β-ol-3-one. |
| 5α-chloro-10β-bromo-17α-methyl-estrane-3β, 17β-diol. | 5α-chloro-10β-bromo-17α-methyl-estran-17β-ol-3-one. |
| 5α-fluoro-10β-iodo-17α-methyl-estrane-3β, 17β-diol. | 5α-fluoro-10β-iodo-17α-methyl-estran-17β-ol-3-one. |
| 5α-chloro-10β-iodo-17α-methyl-estrane-3β, 17β-diol. | 5α-chloro-10β-iodo-17α-methyl-estran-17β-ol-3-one. |
| 5α, 10β-dibromo-17α-ethyl-estrane-3β, 17β-diol. | 5α, 10β-dibromo-17α-ethyl-estran-17β-ol-3-one. |
| 5α, 10β-dichloro-17α-ethyl-estrane-3β, 17β-diol. | 5α, 10β-dichloro-17α-ethyl-estran-17β-ol-3-one. |
| 5α-fluoro-10β-bromo-17α-ethyl-estrane-3β, 17β-diol. | 5α-fluoro-10β-bromo-17α-ethyl-estran-17β-ol-3-one. |
| 5α-chloro-10β-bromo-17α-ethyl-estrane-3β, 17β-diol. | 5α-chloro-10β-bromo-17α-ethyl-estran-17β-ol-3-one. |
| 5α-fluoro-10β-iodo-17α-ethyl-estrane-3β, 17β-diol. | 5α-fluoro-10β-iodo-17α-ethyl-estran-17β-ol-3-one. |
| 5α-chloro-10β-iodo-17α-ethyl-estrane-3β, 17β-diol. | 5α-chloro-10β-iodo-17α-ethyl-estran-17β-ol-3-one. |
| 5α, 10β-dibromo-17α-ethynyl-estrane-3β, 17β-diol. | 5α, 10β-dibromo-17α-ethynyl-estran-17β-ol-3-one. |
| 5α, 10β-dichloro-17α-ethynyl-estrane-3β, 17β-diol. | 5α, 10β-dichloro-17α-ethynyl-estran-17β-ol-3-one. |
| 5α-fluoro-10β-bromo-17α-ethynyl-estrane-3β, 17β-diol. | 5α-fluoro-10β-bromo-17α-ethynyl-estran-17β-ol-3-one. |
| 5α-chloro-10β-bromo-17α-ethynyl-estrane-3β, 17β-diol. | 5α-chloro-10β-bromo-17α-ethynyl-estran-17β-ol-3-one. |
| 5α-fluoro-10β-iodo-17α-ethynyl-estrane-3β, 17β-diol. | 5α-fluoro-10β-iodo-17α-ethynyl-estran-17β-ol-3-one. |
| 5α-chloro-10β-iodo-17α-ethynyl-estrane-3β, 17β-diol. | 5α-chloro-10β-iodo-17α-ethynyl-estran-17β-ol-3-one. |
| 5α, 10β-dibromo-17α-ethenyl-estrane-3β, 17β-diol. | 5α, 10β-dibromo-17α-ethenyl-estran-17β-ol-3-one. |
| 5α, 10β-dichloro-17α-ethenyl-estrane-3β, 17β-diol. | 5α, 10β-dichloro-17α-ethenyl-estran-17β-ol-3-one. |
| 5α-fluoro-10β-bromo-17α-ethenyl-estrane-3β, 17β-diol. | 5α-fluoro-10β-bromo-17α-ethenyl-estran-17β-ol-3-one. |
| 5α-chloro-10β-bromo-17α-ethenyl-estrane-3β, 17β-diol. | 5α-chloro-10β-bromo-17α-ethenyl-estran-17β-ol-3-one. |
| 5α-fluoro-10β-iodo-17α-ethenyl-estrane-3β, 17β-diol. | 5α-fluoro-10β-iodo-17α-ethenyl-estran-17β-ol-3-one. |
| 5α-chloro-10β-iodo-17α-ethenyl-estrane-3β, 17β-diol. | 5α-chloro-10β-iodo-17α-ethenyl-estran-17β-ol-3-one. |

Example XXVII 1 g. of 5α,10β-dibromo-17α-methyl-estrane-3β,17β-diol in 30 cc. of pyridine was treated with 2 cc. of acetic anhydride. The mixture was left overnight at room temperature, then it was poured into water and extracted with methylene chloride. The extract was washed successively with diluted chlorhydric acid, 5% sodium bicarbonate aqueous solution, and water to neutral, then dried and evaporated to dryness. Recrystallization of the solid residue from ethyl acetate-hexane afforded the 3β-acetate of 5α,10β-dibromo-17α-methyl-estrane-3β,17β-diol.

Following exactly the above technique were treated the starting compounds set forth below, thus yielding the indicated products:

| Starting compound | Product |
|---|---|
| 5α,10β-dichloro-17α-ethynyl-estrane-3β,17β-diol. | 3β-acetate of 5α,10β-dichloro-17α-ethynyl-estrane-3β,17β-diol. |
| 5α,10β-dibromo-17α-ethenyl-estrane-3β,17β-diol. | 3β-acetate of 5α,10β-dibromo-17α-ethenyl-estrane-3β,17β-diol. |
| 5α-fluoro-10β-bromo-17α-ethynyl-3β,17β-diol. | 3β-acetate of 5α-fluoro-10β-bromo-17α-ethynyl-3β,17β-diol. |

Example XXVIII 1 g. of 5α,10β-dibromo-17α-methyl-estrane-3β,17β-diol in 30 cc. of pyridine was treated with 1 g. of p-toluenesulfonic acid and 10 cc. of acetic anhydride. The mixture was left for one hour at room temperature, poured into water and stirred until the excess anhydride was hydrolyzed. Isolation of the product by ethyl acetate extraction and recrystallization of the residue from acetone-ether gave the 3β,17β-diacetate of 5α,10β-dibromo-17α-methyl-estrane-3β,17β-diol.

Following exactly the same technique there were obtained from the starting compound set forth below the corresponding product hereafter indicated:

| Starting compound | Product |
|---|---|
| 5α,10β-dichloro-17α-ethynyl-estrane-3β,17β-diol. | 3β,17β-diacetate of 5α,10β-dichloro-17α-ethynyl-estrane-3β,17β-diol. |
| 5α,10β-dibromo-17α-ethenyl-estrane-3β,17β-diol. | 3β,17β-diacetate of 5α,10β-dibromo-17α-ethenyl-estrane-3β,17β-diol. |
| 5α-fluoro-10β-bromo-17α-ethynyl-17β-ol-3-one. | 17β-acetate of 5α-fluoro-10β-bromo-17α-ethynyl-17β-ol-3-one. |
| 5α-chloro-10β-iodo-17α-ethenyl-17β-ol-3-one. | 17β-acetate of 5α-chloro-10β-iodo-17α-ethenyl-17β-ol-3-one. |

I claim:
1. A compound of the following formula:

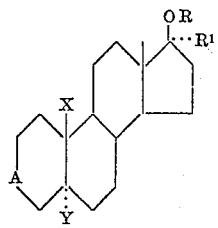

wherein A is selected from the group consisting of β-hydroxymethylene and β-hydrocarbon carboxylic acyloxymethylene of less than 12 carbon atoms; X is selected from the group consisting of chlorine, bromine and iodine; Y is selected from the group consisting of fluorine, chlorine and bromine; R is selected from the group consisting of hydrogen and a hydrocarbon carboxylic acyl group of less than 12 carbon atoms; $R^1$ is selected from the group consisting of hydrogen and an alkyl radical of up to 12 carbon atoms and when $R^1$ is hydrogen, R is the hydrocarbon carboxylic acyl group of less than 12 carbon atoms.

2. 5α,10β-dibromo-17β-acetoxy-estran-3β-ol.
3. 5α,10β-dichloro-17α-methyl-estrane-3β,17β-diol.
4. 5α-fluoro-10β-bromo-17α-ethyl-estrane-3β,17β-diol.
5. 5α-chloro-10β-iodo-17β-acetoxy-estran-3-one.
6. 5α-fluoro-10β-iodo-17α-ethyl-estran-17β-ol-3-one.
7. A compound of the following formula:

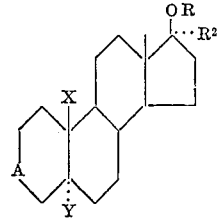

wherein A is selected from the group consisting of β-hydroxymethylene and β-hydrocarbon carboxylic acyloxymethylene of less than 12 carbon atoms; X is selected from the group consisting of chlorine, bromine and iodine; Y is selected from the group consisting of fluorine, chlorine and bromine; R is selected from the group consisting of hydrogen and a hydrocarbon carboxylic acyl group of less than 12 carbon atoms; and $R^2$ is selected from the group consisting of an alkenyl and alkynyl radical containing up to 12 carbon atoms.

8. 5α-chloro-10β-bromo-17α-ethynyl-estrane-3β,17β-diol.
9. 5α-fluoro-10β-iodo-17α-ethenyl-estrane-3β,17β-diol.
10. 5α-fluoro-10β-bromo-17α-ethynyl-estran-17β-ol-3-one.
11. 5α-chloro-10β-bromo-17α-ethenyl-estran-17β-ol-3-one.
12. In a process for the production of 5α,10β-dihalo-estrane derivatives selected from the group consisting of 5α,10β-dihalo-17β-hydroxy-estran-3-one, 5α,10β-dihalo-3β,17β-dihydroxy estrane, the 17α-aliphatic hydrocarbon derivatives and the hydrocarbon carboxylic acid esters thereof of up to 12 carbon atoms, the step which comprises treating the corresponding 3β-ol-Δ$^{5(10)}$-estrane derivative with a halogenating agent selected from the group consisting of chlorine, bromine fluoride, iodine fluoride, bromine chloride and iodine chloride in a suitable solvent selected from the group consisting of carbon tetrachloride and methylene chloride.
13. The process of claim 12 wherein the halogenating agent is chlorine and the solvent is carbon tetrachloride.
14. The process of claim 12 wherein the halogenating agent is bromine fluoride generated in situ from N-bromoacetamide and hydrogen fluoride, and the solvent is methylene chloride.
15. The process of claim 12 wherein the halogenating agent is iodine fluoride generated in situ from N-iodo succinimide and hydrogen fluoride and the solvent is methylene chloride.
16. The process of claim 12 wherein the halogenating agent is bromine chloride generated in situ from N-bromoacetamide and hydrogen chloride and the solvent is methylene chloride.
17. The process of claim 12 wherein the halogenating agent is iodine chloride generated in situ from N-iodo succinimide and hydrogen chloride, and the solvent is methylene chloride.

References Cited in the file of this patent

Reimann et al.: J.A.C.S. 82, pp. 2308–2311, May 5, 1960.

Chem. and Eng. News, September 26, 1960, p. 56 (cols. 2–3).